United States Patent [19]

Bánvölgyi et al.

[11] Patent Number: 5,122,349

[45] Date of Patent: Jun. 16, 1992

[54] PROCESS FOR PRODUCING ALUMINA

[75] Inventors: György Bánvölgyi; József Zöldi; Péter Siklósi; Tibor Ferenczi; T. Anna Csordás; Iván Fehér; Ildikó Tassy née Varju; István Sajó, all of Budapest, Hungary

[73] Assignee: Aluminiumipari Tröszt, Budapest, Hungary

[21] Appl. No.: 530,085

[22] Filed: May 29, 1990

Related U.S. Application Data

[63] Continuation-in-part of Ser. No. 317,778, Mar. 2, 1989, abandoned.

[30] Foreign Application Priority Data

Oct. 27, 1988 [HU] Hungary ............................ 5601/88

[51] Int. Cl.$^5$ ................................................ C01F 7/02
[52] U.S. Cl. ................................. 423/124; 423/127; 423/625; 423/121
[58] Field of Search ................ 423/121, 127, 625, 124

[56] References Cited

U.S. PATENT DOCUMENTS

| | | | |
|---|---|---|---|
| 2,668,751 | 2/1954 | Porter | 423/127 |
| 2,701,752 | 2/1955 | Porter | 423/127 |
| 3,201,199 | 8/1965 | Lindsay et al. | 423/127 |
| 3,401,009 | 9/1968 | Gittos | 423/121 |
| 3,716,617 | 2/1973 | Oku | 423/121 |
| 3,944,648 | 3/1976 | Solymar et al. | 423/121 |
| 4,324,769 | 4/1982 | McDaniel | 423/121 |
| 4,483,830 | 11/1984 | Cresswell et al. | 423/121 |
| 4,614,641 | 9/1986 | Grubbs | 423/121 |
| 4,647,439 | 3/1987 | Lepetit | 423/121 |
| 4,650,653 | 3/1987 | Lepetit | 423/121 |
| 4,661,328 | 4/1987 | Grubbs | 423/121 |

Primary Examiner—Michael Lewis
Assistant Examiner—Steven Bos
Attorney, Agent, or Firm—Schweitzer Cornman & Gross

[57] ABSTRACT

An improvement in the process for extracting alumina from gibbsitic bauxites, wherein the basic, known process comprises mixing the bauxites with a sodium hydroxide-sodium aluminate digestion liquor, digesting the bauxites at a temperature in the range of 100°–180° C., diluting the resulting slurry, separating the red mud therefrom, precipitating alumina hydrate by cooling and agitation of the sodium aluminate liquor, and calcining the alumina hydrate precipitate to obtain alumina, wherein the improvement is characterized by so controlling the process that, in the liquid phase of the slurry leaving the digestion reactor, the reactive hydroxide ion concentration is maintained below 6 g/l, and preferably between 0 and 2 g/l, where the reactive hydroxide ion concentration is defined by the following formula:

$$AH = 34 \left( \frac{C^{eq}_{Al_2O_3,gi} - C_{Al_2O_3}}{102} - \frac{C_{SiO_2}}{60} \right)$$

where:
$C_{Al_2O_3,gi}^{eq}$ is the equilibrium solubility of $Al_2O_3$ for gibbsite, in g/l.
$C_{Al_2O_3}$ is the actual concentration of $Al_2O_3$, in g/l and
$C_{SiO_2}$ is the actual concentration of $SiO_2$, in g/l.

Desirably, control of the process is maintained by regulating the ratio of bauxite to digestion liquor.

10 Claims, No Drawings

PROCESS FOR PRODUCING ALUMINA

This application is a continuation-in-part of Ser. No. 317,778 filed Mar. 2, 1989, now abandoned.

FIELD OF THE INVENTION

This invention relates to an improved and highly efficient process for the extraction of alumina from gibbsitic bauxites.

BACKGROUND OF THE INVENTION

In the practice of the well-known Bayer process, bauxite is digested in a sodium hydroxide-sodium aluminate liquor, unsaturated for sodium aluminate, at temperatures between 100° C. and 300° C., depending on its mineralogical composition, and the soluble aluminum minerals are transformed to sodium aluminate. After digestion, the slurry is cooled to the atmospheric boiling point. After dilution and removal of digestion residue (red mud), aluminum hydroxide (alumina hydrate) is precipitated out of a solution supersaturated for dissolved alumina by further cooling followed by separating the alumina hydrate precipitate. The mother liquor—possibly after concentrating a part of its by evaporation—is recycled to the digestion. After washing, the alumina hydrate is calcined to alumina, i.e. technically pure $Al_2O_3$, at a temperature exceeding 1000° C.

In addition to the digestible aluminum minerals (gibbsite, boehmite, diaspore) bauxites always contain some amounts of silicon-containing components. The $SiO_2$ content occurs mainly as kaolinite ($Al_2O_3.2SiO_2.2H_2O$) but also as Quartz ($SiO_2$), chamosite, illite, halloysite in the bauxites. Moreover $Fe_2O_3$- and $TiO_2$-containing components can also be found in bauxites. Bauxites containing at least 90% of the digestible aluminum minerals in the form of gibbsite are considered to be of the gibbsitic type.

It is well known from the technical literature that the silica-containing minerals found in the bauxites transform to sodium aluminum hydrosilicates during the Bayer process.

Various authors give values between 0.62 and 0.79 for the $Na_2O$ to $SiO_2$ mass ratio of the sodium aluminum hydrosilicates formed from reactive silica in solution of 80 to 200 g/l caustic $Na_2O$ concentrations (135 to 350 g/l as $Na_2CO_3$) and 2.5 to 3.5 caustic molar ratios (0.27 to 0.38 A/C ratios) as 140° to 150° C. temperatures. (Adamson, A.N.: Alumina Production: Principles and Practice. The Chemical Engineer, June 1970, pp. 156–171; Sartowski Z., Vargáné Kiss Zs., Bulkai D.: Előkovasavtalanitás Bayer-eljárás ban. Bányászati és Kohászati Lapok, Kohászat, 114, (1981), 2, pp. 79–85; Yamada, K. Et al.: Process for Extracting Alumina From Aluminous Ores. U.S. Pat. No. 4,426,363). This ratio makes it possible to calculate the chemical caustic soda loss, which is a significant cost component of the alumina manufacturing by Bayer process.

Caustic $Na_2O$ is defined as the amount of $Na^+$ ions equivalent to the sum of the free $OH^-$ ions and to the $OH^-$ ions present as complex aluminate anions e.g. $[Al(OH)_4]^-$ in the liquid phase, expressed as $Na_2O$. The caustic molar ratio is the ratio of the caustic $Na_2O$ and the $Al_2O_3$ mols present in the solution. Any reference herein to "molar ratio", or "c. molar ratio" is meant to refer to the caustic molar ratio defined hereinabove. The use of this expression is most suitable in connection with the present invention, because it permits easy expression of the small aluminate concentration that is a unique characteristic of the present invention, without involving the actual caustic soda concentration that is employed.

In the American terminology, the caustic concentration—understood similarly—is expressed as $Na_2CO_3$. Likewise, the ratio of the concentration of dissolved $Al_2O_3$ to the caustic concentration expressed as $Na_2CO_3$ is also widely used in American terminology, and it is called in the specification and the claim "A/C ratio".

Gibbsitic bauxites are usually digested at 140° to 150° C. (in some exceptional cases at about 105° C.) by the so-called low-temperature digestion process. According to the typical practice, the bauxite is slurried in about 10% to 20% of the liquor recycled to the digestion, which is relatively poor in dissolved $Al_2O_3$ (so-called spent liquor). The slurry—having a temperature of about 80° C—is mixed, after a holding time usually not exceeding 1 to 2 hours and usually without further preheating, with the main flow of the digestion liquor preheated in heat exchangers to about 160° C. By introducing live steam into the mixed slurry the prescribed digestion temperature of 140° to 150° C. is maintained. This briefly described process is called two-stream digestion.

Mother liquors with typical caustic $Na_2O$ concentrations of 90 to 120 g/l (150 to 205 caustic as $Na_2CO_3$) and typical molar ratios of 2.6 to 2.8 (0.34 to 0.37 A/C ratios), obtained after hydrate precipitation (called spent liquors in the technical literature dealing with alumina manufacturing), are used in the digestion of gibbsitic bauxites. The bauxite dosage into the digestion liquor (the bauxite to digestion liquor ratio) is controlled so that the caustic molar ratio of the liquor phase of the slurry leaving the digestion reactor should be 1.35 to 1.45 (its A/C ratio should be 0.66 to 0.71). A retention time of about 40 to 100 minutes is usually utilized in the low temperature digestion process. This is carried out in 3 to 5 series-connected digester vessels (autoclaves). Gibbsite is digested during the first 10 to 20 minutes of the digestion process.

Parallel to the reaction of the gibbsite, kaolinite also is dissolved into the liquid phase. The dissolved silica, probably present in the form of some complex ion, transforms into a solid-phase sodium aluminum hydrosilicate in a reaction leading to an equilibrium. A retention time longer than that required for the dissolving of gibbsite is necessary for the formation of nuclei and growth of the crystals. Therefore, retention times of 40 to 100 minutes are provided in the reactor (Carlos, S.: Interalumina Bauxite Grinding and Digestion. Engineering and Mining Journal, May, 1983, pp. 29–94; Kotte, J.J.: Bayer Digestion and Predigestion Desilication Reactor System. Light Metals. Proc. of AIME Annual Conference, 1981, pp. 45–79).

The liquid phase of the slurry, leaving the reactor at a temperature of 140° to 150° C. and with a molar ratio of 1.35 to 1.45 (0.66 to 0.71 A/C ratio), is supersaturated for boehmite. The ratio of the bauxite and the digestion liquor is controlled so that the difference between the actual $Al_2O_3$ concentration of the liquor and the equilibrium value be not less than 18 to 20 g/l. Should this difference be less, the secondary boehmite formation amounting to 0.5% to 2% $Al_2O_3$ during the usual retention time would increase and attain an extent unbearable from the economic point of view because of the increase of the supersaturation of the liquor for boehmite.

The purpose of the red mud washing is to minimize the caustic Na₂O and Al₂O₃ concentrations of the liquor accompanying the red mud. In the settler the liquid phase is supersaturated for Al₂O₃, so the precipitation of the equilibrium phase i.e. gibbsite begins. Due to the lower caustic Na₂O concentration and temperature in the first washing stage the supersaturation for Al₂O₃ is higher than in the settler, so the secondary gibbsite formation is more intensive. Due to the secondary gibbsite formation, a loss amounting to 2% to 3% of the Al₂O₃ content of the processed bauxite can be observed during the settling and washing of the red mud.

European Patent Application No. 203,873 deals with the processing of low-SiO₂ gibbsitic bauxites. According to the process of Lepetit and Mordini, the bauxite is ground in a liquor of 50 to 120 g/l caustic Na₂O concentration (90 to 205 g/l as Na₂CO₃) originating at least partially from the washing of red mud or alumina hydrate. The resulting slurry is treated at a temperature of 80° to 100° C. for such a time that at least 85% of the kaolinite is transformed into sodium aluminum hydrosilicate. The disadvantage of this process is that, as a result of the grinding in a wash water, the digestion is burdened with the feeding of excess water, the evaporation of which will increase the energy consumption of the processing.

A procedure for the processing of high-kaolinite-containing gibbsitic bauxites is proposed by Grubbs (U.S. Pat. No. 4,614,641). According to this invention the bauxite is crushed and subsequently classified at 105 μm (150 mesh). The fine fraction, richer is kaolinite, is digested in a sodium aluminate liquor, having a caustic Na₂O concentration higher than 140 g/l (240 g/l as Na₂CO₃), at a temperature of 80° to 130° C. The solid phase is removed by settling and the liquid phase, rich in aluminum and silica, is mixed with the coarse fraction digested in a separate stream at 140° to 150° C.

A procedure has been proposed by Grubbs, in U.S. Pat. No. 4,661,328 for the processing of gibbsitic bauxites having a high kaolinite content. According to Grubbs the dissolution of kaolinite is inversely related to the caustic concentration and silica concentration of the digestion liquor. The digestion liquor originally having a low silica concentration, is fed to a back mixed reactor in which the silica and alumina concentrations of the digestion liquor are increased to slightly below saturation levels. The bauxite has a reactive silica content of over 5% by weight, and the digestion liquor typically contains 1.8-2.5 g/l silica, 150-170 g/l alumina, and 240-300 g/l caustic soda expressed as calcium carbonate (140-175 g/l caustic Na₂O). 80°-150° C., preferably 90°-130° C. digestion temperature is employed. A desilication seeding product is added to enhance desilication of the digestion liquor. The digestion residue is separated, and the alumina hydrate is precipitated as is customary in the Bayer process. A drawback of this Grubbs process is that it employs a digestion liquor that is nearly saturated in silica and nearly saturated in alumina. Therefore, must of its digestion capacity is sacrificed, leaving available for digestion only the small difference between the saturation level in alumina, and the actual near saturation level of alumina in the liquor. This results in the unfavorable requirement of huge amounts of digestion liquor to enable the dissolution of sufficient amounts of alumina hydrate.

An unfavorable characteristic of the process widely used for the processing of gibbsitic bauxites is the chemical caustic soda loss caused by the reactive SiO₂ fed into the alumina plant with an Na₂O/SiO₂ mass ratio of about 0.65 to 0.69. The dissolving potential of the digestion liquor is not utilized completely, so excess heat and power is used for heating and pumping part of the liquor flow. This also reduces the capacity of the digestion plant unit and increases the specific energy consumption. Another disadvantage of the typical low-temperature digestion process is the retention time of 0.5 to 2 hours, which requires the installation of expensive pressure vessels (autoclaves). It is difficult to solve the material handling and to prevent the settling of the solid phase in the autoclaves. Yet another disadvantage of the widely used low-temperature digestion process is the secondary boehmite formation, which often causes Al₂O₃ losses amounting to 0.5% to 2%. The secondary gibbsite formation in the settling and washing system is also a disadvantage of the present processes, leading usually to Al₂O₃ losses of 2% to 3%.

DETAILED DISCLOSURE OF THE INVENTION

A principal objective of the present invention is the reduction of the disadvantages of the known processes by a process improvement, which makes possible a reduction of the chemical caustic soda losses caused by reactive SiO₂, enables a more complete utilization of the dissolving potential of the digestion liquor and of the capacity of the equipment, and permits a significant reduction of the time required for the digestion reaction and of the energy consumption of the digestion process. Furthermore, the process of the invention enables the attaining of an SiO₂ concentration in the liquor favorable for the manufacturing of alumina of a quality which corresponds to the requirements of the market. A further aim of the invention is to reduce or prevent the secondary boehmite and gibbsite formations which causes Al₂O₃ losses.

Predesilication tests, carried out at 100° C. in liquors containing 100 to 180 g/l caustic Na₂O (170 to 310 g/l as Na₂CO₃) and having molar ratio of 3.1 to 3.4 (0.28 to 0.31 A/C ratios) with slurries having various solids contents, have shown that, in the concentration range of 100 to 150 g/l caustic Na₂O (170 to 260 g/l as Na₂CO₃), the transformation of kaolinite practically stops after 4 to 6 hours. An increase of the retention time to even 15 hours will not lead to a greater transformation into sodium aluminum silicate than the 50 to 70% attained within 4 to 6 hours.

The connection between the dissolution of gibbsite and the transformation of kaolinite has not previously been investigated in a systematic way. We have investigated the mechanism of the reaction by means of kinetic modelling. Through this kinetic modelling, we have come to the conclusion that the common driving force of dissolution of both the kaolinite and the gibbsite is the reactive OH⁻ concentration in a complex reaction mechanism; the kaolinite and the gibbsite compete for the reactive OH⁻ ions present in the system. The definition of the reactive OH⁻ concentration is the following:

$$AH = 34 \left( \frac{C^{eq}_{Al_2O_3,gi} - C_{Al_2O_3}}{102} - \frac{C_{SiO_2}}{60} \right)$$

where:

$C^{eq}_{Al_2O_3,gi}$ is the equilibrium solubility of Al₂O₃ for gibbsite, in g/l.

$C_{Al_2O_3}$ is the actual concentration of $Al_2O_3$, in g/l and $C_{SiO_2}$ is the actual concentration of $SiO_2$, in g/l.

The 102 is the formula represents the molar mass of $Al_2O_3$, the 60 the molar mass of $SiO_2$, and the 34 the molar mass of two $OH^-$ ions. There is no significant change if the concentration of the dissolved $SiO_2$ is neglected at the calculation of AH since this is usually lower by 2 to 3 orders of magnitude than the concentration of $Al_2O_3$.

According to the technical literature the kaolinite is dissolved in a very short time in the course of the transformation process (Adamson, A.N.: Alumina Production: Principles and Practice. The Chemical Engineer, June, 1970, pp. 156-171; Kotte, J.J.: Bayer Digestion and Predigestion Desilication Reactor System. Light Metals, Proc. of AIME Annual Conference. 1981, pp. 45-79). Insofar as we are aware, the relative reaction rates of the parallel reactions of gibbsite and kaolinite in alkali hydroxide-alkali aluminate liquors, and the connection between these reactions, have not been investigated.

The higher the caustic concentration, the higher the saturation $Al_2O_3$ concentration. Therefore, the reactive $OH^-$ concentration is also higher, and so that dissolution rate of the kaolinite also becomes greater.

In the course of the kinetic modelling we have found (unexpectedly on the basis of the technical literature) that the dissolution rate of gibbsite is 2 to 8 times higher than that of kaolinite. This experience has led to the perception that if a sufficient amount of gibbsite is present, it will use up the available reactive $OH^-$ ions, and a certain (under given circumstances a significant) part of the kaolinite will "survive" digestion, even at 140° to 160° C. This perception has been supported by our tests. Where a sufficient amount of gibbsite was present, the $Na_2O/SiO_2$ ratios found in the digestion residue was significantly lower (0.4 to 0.5) than the theoretical value of 0.69. Unreacted kaolinite could be identified by X-ray diffractometry even after a 150° D. digestion lasting for 20 or even 60 minutes. These results were unexpected on the basis previous knowledge.

The best kinetic model, describing the results of the tests carried out in sodium hydroxide-sodium aluminate solutions of various concentrations but similar molar (A/C) ratios, suggest that the sodium aluminum hydrosilicate formed during the reaction slows down and finally stops the further transformation of kaolinite. This phenomenon can be explained by the perception that, during a proper predesilication, kaolinite is partly covered by a sodium aluminum hydrosilicate layer formed during the transformation of apart of the kaolinite and this coating layer prevents the further transformation of kaolinite. Recent research has proven the presence of sodium aluminum hydrosilicate on the surface of partially transformed kaolinite (Roach G.I.D., White, A.J.: Dissolution of Kinetics of Kaolin in Caustic Liquors. Light Metals. Proc. of AIME Annual Conference, 1988, pp. 41-47).

The basis of the present invention is the perception that complete transformation of the kaolinite into sodium aluminum hydrosilicate can be prevented during a digestion at from about 140° C. to about 180° C. if the reactive $OH^-$ concentration of the liquid phase of a slurry is kept below about 6 g/l, suitably below 2 g/l, at the outlet of the digestion reactor, and the kaolinite in the bauxite fed into the reactor is not converted into sodium aluminum hydrosilicate during the previous operations to an extent of more than 80 percent.

The present invention is directed to an improvement in an otherwise known process for producing alumina from gibbsitic bauxites by digesting of the bauxite in a sodium hydroxide-sodium aluminate liquor at a temperature between about 100° C. and about 180° C., separating the red mud, precipitating alumina hydrate from the sodium aluminate liquor through cooling and agitation, and calcining the precipitated alumina hydrate, wherein the improvement is that the reactive $OH^-$ ion concentration (AH), as defined by the above formula, is kept below 31 about 6 /gl, suitably between 0 and about 2 g/l, in the liquid phase of the slurry leaving the digestion reactor. This is achieved by properly controlling the ratio of the bauxite to the digestion liquor.

The digestion equipment consists of three main parts:
(1) a preheating section for preheating the digestion liquor and/or the bauxite slurry, (2) a digestion reactor, and (3) equipment for reducing the temperature and pressure of the slurry leaving the reactor.

If we neglect the $SiO_2$ concentration when calculating the reactive hydroxide concentration, the driving force of the reaction will be proportional to the difference of the equilibrium solubility and actual concentration of $Al_2O_3$. Therefore, in the process according to this invention the digestion is carried out so that the actual $Al_2O_3$ concentration, in the liquid phase of the slurry at the outlet of the digestion reactor, is maintained within about 18 g/l, suitably button within 0 to about 6 g/l of the equilibrium solubility by controlling the ratio of bauxite and digestion liquor.

It was found in accordance with the present invention the rate of digestion can be desirably and favorably increased by the that use of a digestion liquor that has a high caustic concentration, but one that has a low silica and low alumina content. Suitably the $SiO_2$ concentration is lower than about 1 g/l, most suitably below about 0.6 g/l. Suitably the caustic molar ratio in the digestion liquor is greater than about 2.1, and the A/C ratio is suitably below about 0.45, most suitably below about 0.4.

In accordance with the present invention the AH concentration value is maintained in the liquid phase of the slurry exiting the reactor by regulation of the bauxite content of the digestion liquor to stay below about 6 g/l. This measure alone prevents the complete conversion of the kaolinite in spite of the fact that the dissolution rate of kaolinite in the present digestion liquor is much greater than in the near saturated digestion liquors of the prior art.

Compared to the known process of Grubbs' U.S. Pat. No. 4,661,328, when considering identical caustic concentration and identical digestion temperature, as shown below, we calculated the reactive $OH^-$ ion concentration, i.e. the AH value, but not for the liquid phase of the slurry exiting the reactor, but considering rather the digestion liquor itself, both in the case of Grubbs and in the case of the present invention, then the calculation yields 8.6 g/l for the Grubbs solution, and 36.8 g/l AH concentration for the digestion liquor of the present invention. The following typical characteristic data were considered in these calculations:

|  | Grubbs' dig. liqu. | Our dig. liqu. |
| --- | --- | --- |
| digest. liqu. caust. soda g/l | 240 | 240 |

|  | Grubbs' dig. liqu. | Our dig. liqu. |
|---|---|---|
| $Al_2O_3$ g/l | 160 | 78 |
| A/C ratio | 0.66 | 0.325 |
| $SiO_2$ g/l | 2.0 | 0.4 |
| Digestion temperature °C. | 143 | 143 |
| AH (reactive OH conc.) g/l at digestion temperature | 8.6 | 36.8 |

In calculating the A/C ratio for the alumina and caustic concentrations of Grubbs, the ratio varies between 0.5 and 0.71.

During the practical realization of this invention it is preferable to compute the controlled variable with the help of a mathematical model of the process. The process can also be easily controlled by measuring the electric conductivity of the digested slurry.

During the practice of the process of this invention it is preferable to hold the mixture of the bauxite, and at least 10% of the digestion liquor, for some time. This procedure (called predesilication) is carried out at a temperature between 80° and 120° C., and preferably between 90° and 100° C., while providing gentle agitation with an energy input of 0.03 to 0.2 kW/m³ of slurry. The transformation of the kaolinite is interrupted after 0.5 to 20 hours, and preferably after 3 to 6 hours, i.e., after the transformation to sodium aluminum hydrosilicate of 10 to 80%, and preferably 20 to 50% of the kaolinite. In this way the complete transformation of the still-unreacted part of the kaolinite into sodium aluminum hydrosilicate, during the subsequent operations, can be prevented. At the same time, by forming sodium aluminum hydrosilicate nuclei in the solid phase fed into the digestion reactor, the precipitation of the $SiO_2$ dissolved into the liquid phase during the digestion operation in the from of sodium aluminum hydrosilicate is promoted.

The process of the present invention provides significantly shorter digestion retention times for gibbsitic bauxites than is customary with prior art processes, i.e., 1 to 60 minutes, and preferably 3 to 20 minutes. This process can also be economically carried out in a tube digestion reactor which is more advantageous from the point of view of operation than the so-called autoclave batteries typically employed.

Furthermore, it is preferable to feed a sodium hydroxide-sodium aluminate liquor weak in dissolved $Al_2O_3$ to the dilution and/or red mud separation (settling or filtering) and/or red mud washing. In this way the supersaturation of the liquid phase for $Al_2O_3$ in the washing operation can be reduced, and thereby the undesirable secondary gibbsite formation is also reduced. An alumina plant liquor is considered to be weak in dissolved $Al_2O_3$ if its caustic molar ratio exceeds 2.5, and preferably 2.7 (A/C ratio is less than 0.38, preferably 0.36). Such liquor, weak in dissolved $Al_2O_3$, can be spent liquor and also a liquor originating from red mud causticizing, carbonate salt causticization, alumina hydrate washing and hydrothermal treatment of red mud, or any mixture of them. The liquor(s) weak in dissolved $Al_2O_3$ can be fed to the red must slurry, or to the washing liquor, at one or more points in the process of red mud settling and/or washing.

It is preferable to determine the optimum distribution of the spent liquor by-passing the digestion between the settling operation and the washing line of the basis of a techno-economic calculation, also taking into consideration the process control aspects.

The optimum combination of the process parameters has to be determined for bauxites of various origin and quality by optimizing experiments.

A simplified example is given for the determination of the acceptable $SiO_2$ concentration after digestion. Let us consider an alumina plant processing a good quality gibbsitic bauxite and giving a low amount of red mud. Let us suppose that 75 kg $Al_2O_3$ will be precipitated from 1 m³ of green (pregnant) liquor during the decomposition. The $SiO_2$ concentration of the product alumina is to be limited to 0.020%, and 25% of the $SiO_2$ content of the liquid phase leaving the digestion is to be precipitated during dilution and settling. It is known from the technical literature that some 2% of the dissolved $SiO_2$ fed into the decomposition will get into the product alumina (Teas, E.B., Kotte. J.J.: Efect of Impurities of Process Efficiency and Methods for Impurity Control and Removal. Proc. of JBI/JGS Symposium 1980 titled "Bauxite/Alumina Industry in the Americas"). Let use further suppose that the caustic $Na_2O$ concentration of the liquor leaving the digestion reactor, before the heat recovery, and that of the liquor fed into the decomposition, do not differ significantly and that the whole amount of spent liquor will pass through the digestion. In this case the amount of the liquid phase leaving the digestion reactor and that entering the decomposition will be similar. According to the assumptions, a 1 g/l $SiO_2$ concentration may be allowed in the liquid phase leaving the digestion reactor, calculated from the $SiO_2$ balance.

The main advantages of the process corresponding to the present invention are the following:

(1) The complete transformation of the silica-containing minerals is prevented. As a result, the chemical caustic soda losses are reduced to an $Na_2O/SiO_2$ ratio of 0.4 to 0.55.

(2) Compared to the previously used processes, more bauxite can be digested by a volume unit of digestion liquor. Accordingly, the energy consumption of the digestion process is less and the digestion equipment can be smaller or the capacity of existing equipment increased.

(3) The digestion retention time can be reduced, which enables a further capacity increase of existing reactors or a significant saving can be made at the installation of new equipment.

(4) By using the present process, the gibbsite-to-boehmite transformation, proceeding as a secondary reaction of the digestion, and resulting $Al_2O_3$ losses, can be decreased or be practically eliminated.

(5) Secondary gibbsite formation in the settling and red mud washing operation can be reduced significantly.

The following comparative Table shows the comparison of the widely used procedures for the low-temperature digestion, and of the process according to the invention.

COMPARATIVE TABLE

|  |  | typical conventional process | process according to this invention |
|---|---|---|---|
| dig. liqu. caustic $Na_2O$ concentration, caustic as $Na_2CO_3$ | g/l | 140 | 140 |
| caustic as $Na_2CO_3$ | g/l | 240 | 240 |
| dig. liqu. $Al_2O_3$ concentr. | g/l | 84 | 84 |

COMPARATIVE TABLE-continued

|  | | typical conventional process | process according to this invention |
|---|---|---|---|
| dig. liqu. A/C ratio | | — | 0.35 | 0.35 |
| dig. liqu. $SiO_2$ concentr. | g/l | 0.4 | 0.4 |
| molar ratio after digestion, | | — | 1.35 | 1.20–1.25 |
| A/C ratio after digestion | | — | 0.71 | 0.77–0.80 |
| digestion temperature | °C. | 143 | 150–160 |
| retention time of the slurry in the reactor | min | 100 | 3–15 |
| reactive $OH^-$ ion concentration to the outlet of the digestion reactor | g/l | 7 | 2 |
| $Na_2O/SiO_2$ ratio in the red mud | — | 0.69 | 0.40–0.55 |
| secondary boehmite formation during digestion | $Al_2O_3\%$ | 0.5–2 | 0–0.5 |
| secondary gibbsite formation during red mud settling and washing | $Al_2O_3\%$ | 2–3 | 0–0.5 |
| pregnant liquor molar ratio | — | 1.40 | 1.40 |
| A/C ratio in pregnant liquor | — | 0.69 | 0.69 |
| spent liquor by-passing the digestion | % | 0.0 | 20–25 |

The present invention will be further explained by means of the following examples. However, they are not intended to limit the claims.

EXAMPLE 1

An "ultrafine" quality bauxite, originating from the Trombetas deposit in Brazil and having the following composition, was used for the tests:

| $Al_2O_3$ in | gibbsite | 51.0–51.4% |
|---|---|---|
| | boehmite | 0.4–0.8% |
| | kaolinite | 2.2% |
| $SiO_2$ as | quartz | 54.0% |
| | | 0.52% |
| | in kaolinite | 2.53% |
| | | 3.05% |
| $Fe_2O_3$ as | hematite | 7.7% |
| | in goethite | 4.3% |
| | | 12.0% |
| Loss on ignition | | 29.9% |

This bauxite was digested in alumina plant liquor containing 152.3 g/l caustic $Na_2O$ (60.4 g/l as $Na_2CO_3$), 79.7 g/l $Al_2O_3$ (A/C ratio 0.31) and 0.3 g/l $SiO_2$. 235 g dry bauxite was charged into the digester bombs for every liter of digestion liquor.

The testing time was measured from the moment when the bombs were immersed into the oil bath previously preheated to 150° C. As a consequence of the experimental technics applied (because of the time required for the heating of the digester bombs and the slurry inside them) the actual retention time of the slurry at the temperature of the bath was less than the measured test time. Subsequent to the test time periods the bombs were opened after cooling, the liquid phase was separated by centrifuging and analyzed. The solid phase was washed with distilled water three times, dried and analyzed. The results were the following:

| Test time min | liquid phase | | | | | | | solid phase | |
|---|---|---|---|---|---|---|---|---|---|
| | caustic | | | | | | active | | |
| | as $Na_2O$ g/l | as $Na_2CO_3$ g/l | $Al_2O_3$ g/l | c. molar ratio | A/C ratio | $SiO_2$ g/l | OH g/l | $\frac{Na_2O}{SiO_2}$ | $\frac{Al_2O_3}{SiO_2}$ |
| 10 | 136.2 | 232.9 | 179.2 | 1.25 | 0.77 | 1.07 | 3.14 | 0.137 | 6.90 |
| 15 | 133.1 | 227.6 | 182.4 | 1.20 | 0.80 | 0.92 | 0.26 | 0.319 | 1.80 |
| 20 | 134.2 | 229.5 | 185.5 | 1.19 | 0.81 | 0.68 | 0.03 | 0.327 | 1.52 |

It should be mentioned that, if the $Al_2O_3/SiO_2$ mass ratio of the sodium aluminum hydrosilicate formed from the kaolinite content of the bauxite under the given test condition is taken as 0.85 (equal to that of the kaolinite), and the boehmite content is considered as undigestible, the $Al_2O_3/SiO_2$ mass ratio expected in the mud, in the case of a complete digestion of the gibbsite content, would be 1.01 to 1.17 depending of whether the boehmitic $Al_2O_3$ content is calculated with 0.4 or 0.8%.

As the above table shows, the molar ratio of the liquor, the $Na_2O/SiO_2$ and the $Al_2O_3/SiO_2$ ratios measured in the solid phase, and the $SiO_2$ concentration of the liquor are all favorable after 15 and 20 minutes. No secondary boehmite formation was experienced.

EXAMPLE 2

The composition of both the bauxite and the liquor used for the tests was the same as in Example 1. The digestion was carried out in the digester bombs at 150° C. with 60 min reaction time. The results were the following:

| Bauxite charge g | liquid phase | | | | | | | solid phase | |
|---|---|---|---|---|---|---|---|---|---|
| | caustic | | | | | | active | | |
| | as $Na_2O$ g/l | as $Na_2CO_3$ g/l | $Al_2O_3$ g/l | c. molar ratio | A/C ratio | $SiO_2$ g/l | OH g/l | $\frac{Na_2O}{SiO_2}$ | $\frac{Al_2O_3}{SiO_2}$ |
| 235 | 135.4 | 231.5 | 189.6 | 1.17 | 0.82 | 0.58 | 0.00 | 0.346 | 1.21 |
| 221 | 134.9 | 230.7 | 180.9 | 1.23 | 0.78 | 0.73 | 1.97 | 0.386 | 1.02 |
| 207 | 132.3 | 226.2 | 174.5 | 1.25 | 0.77 | 0.54 | 2.63 | 0.409 | 1.10 |

Despite the long reaction time favorable molar ratios, $SiO_2$ concentrations and $Na_2O/SiO_2$ and $Al_2O_3/SiO_2$ mass ratios were obtained. The presence of unreacted kaolinite could be detected in the solid phase after 60 min digestion time. No secondary boehmite formation was experienced.

EXAMPLE 3

The composition of the bauxite was the same as in Example 1. The alumina plant liquor used for this test contained 140 g/l caustic $Na_2O$ (239.4 g/l as $Na_2CO_3$), 74.1 g/l $Al_2O_3$ (0.31 A/C ratio) and 0.4 g/l $SiO_2$. After charging 800 g dry bauxite to 1 liter liquor, a 2 hour predesilication was applied at 100° C. under gentle mixing. A subsequently the slurry was diluted with the digestion liquor to such an extent that a bauxite charge of 232 g/l liquor was obtained. The slurry was subjected to a 15 min digestion at 150° C. in digester bombs. After the digestion the following results were obtained:

| Test time min | liquid phase | | | | | | | solid phase | |
|---|---|---|---|---|---|---|---|---|---|
| | caustic | | | | | | active | | |
| | as Na$_2$O g/l | as Na$_2$CO$_3$ g/l | Al$_2$O$_3$ g/l | c. molar ratio | A/C ratio | SiO$_2$ g/l | OH g/l | Na$_2$O SiO$_2$ | Al$_2$O$_3$ SiO$_2$ |
| 15 | 127.2 | 217.5 | 165.4 | 1.27 | 0.76 | 0.81 | 2.49 | 0.504 | 1.01 |

Favorable Na$_2$O/SiO$_2$ and Al$_2$O$_3$/SiO$_2$ mass ratios, digestion molar ratio and SiO$_2$ concentration were obtained. No secondary boehmite formation was experienced.

EXAMPLE 4

The composition of the bauxite and the liquor and also the bauxite charge were the same as in Example 3. A 4 hour predesilication was applied at 100° C., the slurry was diluted to the same extent as in Example 3 and subsequently digested. The data measured after a 150° C. digestion were the following:

| Test time min | liquid phase | | | | | | | solid phase | |
|---|---|---|---|---|---|---|---|---|---|
| | caustic | | | | | | active | | |
| | as Na$_2$O g/l | as Na$_2$CO$_3$ g/l | Al$_2$O$_3$ g/l | c. molar ratio | A/C ratio | SiO$_2$ g/l | OH g/l | Na$_2$O SiO$_2$ | Al$_2$O$_3$ SiO$_2$ |
| 15 | 126.1 | 216.1 | 164.2 | 1.27 | 0.76 | 0.71 | 3.08 | 0.522 | 1.02 |

The digestion molar ratio, the SiO$_2$ concentration and the Na$_2$O/SiO$_2$ and the Al$_2$O$_3$/SiO$_2$ mass ratios were all favorable. No secondary boehmite formation was experienced.

What is claimed is:

1. A process for producing alumina from gibbsitic bauxite by mixing the bauxite with a sodium hydroxide-sodium aluminate digestion liquor, having an A/C ratio digesting in a digestion reactor the bauxite in said liquor at a temperature of 100°-180° C. to form a resulting slurry having a liquid phase, of sodium aluminate liquor and red mud, diluting the slurry, separating the red mud therefrom, precipitating alumina hydrate from the thus-obtained sodium aluminate liquor through cooling and agitation, and calcining the precipitated alumina hydrate into alumina, the improvement characterized by so controlling the process that, in the liquid phase of the slurry leaving the digestion reactor, maintaining a reactive hydroxide ion concentration below about 6 g/l, said reactive hydroxide ion concentration, AH, being defined by the following formula $$AH = 34 \left( \frac{C^{eq}_{Al_2O_3,gi} - C_{Al_2O_3}}{102} - \frac{C_{SiO_2}}{60} \right)$$

where $C_{Al_2O_3,gi}$ is the equilibrium solubility of Al$_2$O$_3$ for gibbsite, in g/l.
$C_{Al_2O_3}$ is the actual concentration of Al$_2$O$_3$, in g/l. and
$C_{SiO_2}$ is the actual concentration of SiO$_2$, in g/l, and wherein the A/C ratio of the digestion liquor is below about 0.45, and the SiO$_2$ concentration of the liquor is less than about 1 g/l.

2. The process of claim 1 wherein said A/C ratio is less than about 0.4, and the SiO$_2$ concentration is less than about 0.6 g/l.

3. The process of claim 1, wherein the digestion liquor contains a maximum of 135 g/l Al$_2$O$_3$.

4. The process of claim 1, wherein the Al$_2$O$_3$ concentration is maximum of about 100 g/l, and the sodium expressed as Na$_2$CO$_3$ has a concentration between from about 150 and about 300 g/l.

5. The process of claim 1, further characterized by the reactive hydroxide ion concentration being maintained at a level between about 0 and about 2 g/l.

6. The process of claim 1, wherein the bauxite has a ratio to the digestion liquor, further characterized by the reactive hydroxite ion concentration being maintained by controlling the ratio of bauxite to the digestion liquor.

7. The process of claim 1, further characterized by the bauxite being mixed with at least 10% of the digestion liquor, and the resulting slurry being held before digestion at a temperature of from about 80° to about 100° C. for about 0.5 to about 20 hours.

8. The process of claim 7, further characterized by said resulting slurry, while being held before digestion, being agitated using agitating power of from about 0.03 to about 0.2 kw per cubic meter of slurry.

9. The process of claim 1, wherein the slurry has an electrical conductivity, further characterized by the reactive hydroxide ion concentration being controlled by measurement of the electric conductivity of the slurry.

10. The process according claim 1, there being a difference between the actual concentration of Al$_2$O$_3$ and the equilibrium solubility thereof, and wherein said digestion reactor has an outlet, further characterized by the digesting being carried out so that the difference between the actual concentration of Al$_2$O$_3$ and the equilibrium solubility thereof, in the slurry at the outlet of the digestion reactor, is not greater than 18 g/l.

* * * * *